June 15, 1937. W. E. ENGLAND 2,084,021
COVER FOR RUNNING BOARDS AND THE LIKE
Filed June 8, 1934 2 Sheets-Sheet 1
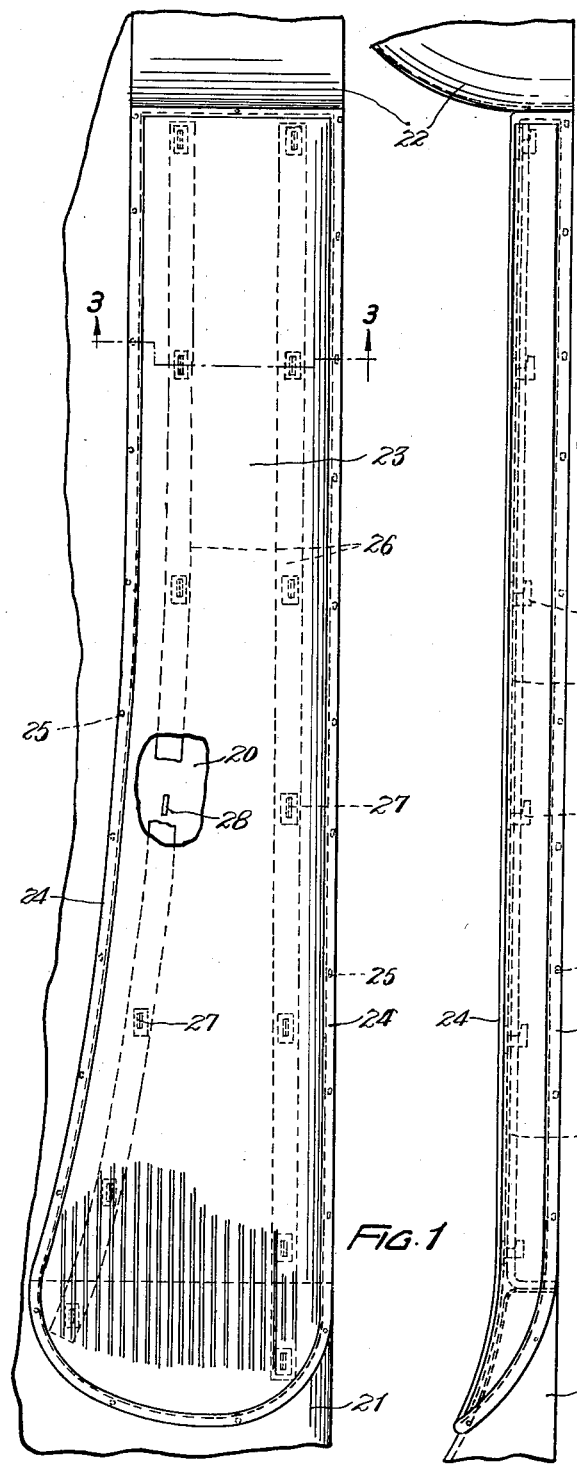
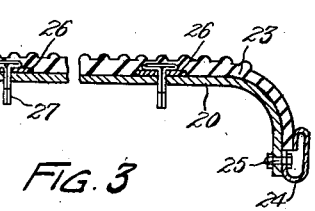
FIG. 3
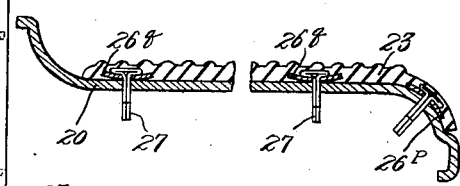
FIG. 4
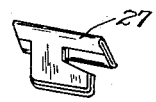
FIG. 5
INVENTOR
WILLIAM E. ENGLAND
Kwis Hudson & Kent
ATTORNEYS June 15, 1937.     W. E. ENGLAND     2,084,021
COVER FOR RUNNING BOARDS AND THE LIKE
Filed June 8, 1934     2 Sheets-Sheet 2
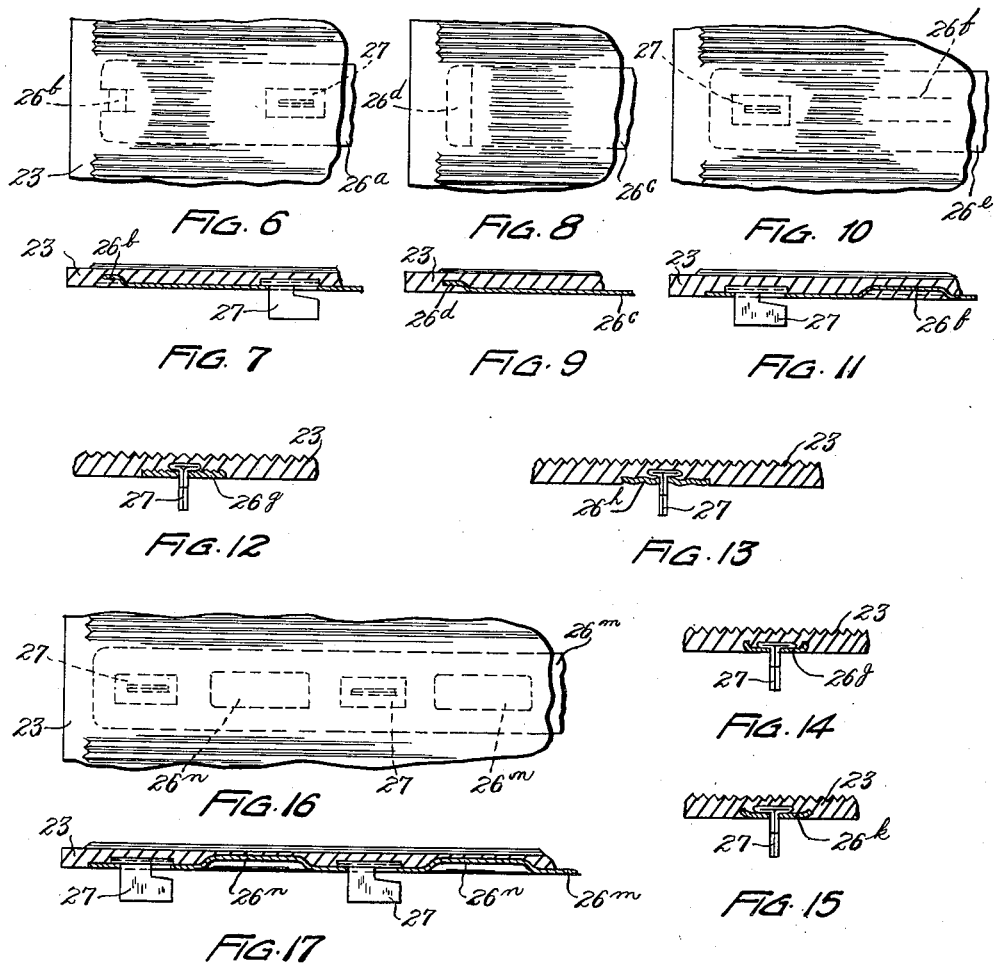
INVENTOR:
WILLIAM E. ENGLAND
Kwis Hudson & Kent
ATTORNEYS Patented June 15, 1937

2,084,021

UNITED STATES PATENT OFFICE 2,084,021

COVER FOR RUNNING BOARDS AND THE LIKE

William E. England, Willoughby, Ohio, assignor to The Ohio Rubber Company, Willoughby, Ohio, a corporation of Ohio Application June 8, 1934, Serial No. 729,626

7 Claims. (Cl. 280—169)

This invention relates to covers for running boards and the like of the flexible attachable type and preferably formed of rubber or other suitable non-metallic material.

The invention is an improvement over the covers forming the subject matter of application Serial No. 724,940 filed May 10, 1934 and Serial No. 725,537 filed May 14, 1934. In these applications are illustrated rubber running board covers designed to be fastened mechanically to the running boards by fastening clips or equivalent devices, the covers being made flexible so that they will conform to the curvatures of the board and lie smoothly thereon when fastened in place. In one of these applications, Serial No. 725,537, the covers are formed of rubber reenforced with flat flexible strips which preferably extend lengthwise of the cover substantially from end to end, with the strips embedded in the rubber and vulcanized in place flush with the lower surface thereof and with the clips having their heads embedded in the rubber next to the strip and extending at intervals through the strips and through the lower surface of the cover so that they may be inserted in slots formed in the running board body and twisted or otherwise manipulated to fasten the cover in place. In the other of these applications referred to above, the cover is held in place either by short isolated anchorage plates molded in the rubber flush with the lower surface thereof and with clips associated therewith or by a combination of the isolated plates and clips with one or more of the strips with their associated clips.

It has been found that covers of this type answer the requirements, but, in some instances, there is a tendency for the strips to pull loose from the rubber, particularly at their ends. It is the principal object of the present invention to increase the surface of contact between the rubber and the strip or isolated plate reenforcement and anchorage means, and to provide certain distortions or changes in the normal configurations of the strips or plates to provide a more effective interlock between the rubber and the embedded metal.

The invention may be briefly summarized as consisting in certain novel details of construction and combinations and arrangements of parts which will be described in the specification and set forth in the appended claims.

In the accompanying sheets of drawings wherein there are illustrated several embodiments of the present invention—

Fig. 1 is a plan view of a running board cover attached to a running board and illustrating portions of the adjacent parts of the vehicle chassis adjacent the running board;

Fig. 2 is an edge view of the same, the reenforcing means in the form of strips and the fastening clips being illustrated by dotted lines in this figure as well as in Fig. 1;

Fig. 3 is a transverse sectional view substantially along the line 3—3 of Fig. 1;

Fig. 4 is a similar sectional view showing a modification;

Fig. 5 is a perspective view of a fastening clip which is preferably employed in securing the cover to the running board;

Fig. 6 is a fragmentary plan view showing a portion of one of the strips and illustrating one way in which the end thereof may be anchored in the rubber, the parts being shown on an enlarged scale;

Fig. 7 is a longitudinal sectional view of the same;

Fig. 8 is a view similar to Fig. 6 showing another modification;

Fig. 9 is a longitudinal sectional view of the modification of Fig. 8;

Fig. 10 is a view similar to Figs. 6 and 8 showing a still further modification;

Fig. 11 is a longitudinal sectional view of the same;

Figs. 12, 13, 14, and 15 are sectional views taken through a reenforcing strip or other clip anchorage and illustrating still different interlocks between the anchorage means and the rubber;

Fig. 16 is a view similar to Figs. 6, 8, and 10, showing a further modification; and Fig. 17 is a longitudinal sectional view of the same.

Referring now to the drawings, 20 represents a running board curved downwardly at the front, flanged downwardly at its ends, and attached to the front fender 21 and rear fender 22. Extending over substantially the entire running board is a cover 23 which is preferably formed of rubber, although, as previously stated, equivalent non-metallic material may be employed so long as it answers the necessary requirements as to flexibility, durability, appearance, and the like. In this instance, the cover 23 extends not only over the board but a distance up along the adjacent portion of the fender 21, and it extends over the curved front of the board as illustrated in Fig. 3. This cover is held in place all around its margin or perimeter by a binding strip 24 which is secured to the board by suitable fasteners 25 and overlaps the margin of the cover. Inside the margin the cover is held in place by fasteners.

In this instance, a pair of flexible metal strips 26 are embedded in the lower side of the cover flush with the lower surface, as illustrated in Fig. 3, thin flexible steel coated with brass or copper to obtain a good bond with the rubber being preferred. These strips serve as a cover reenforcement and as anchorage means for a series of fastening clips such as illustrated at 27 in Fig. 5, these clips being formed from sheet metal, as more fully described in the prior applications referred to, and having heads which are embedded in the rubber next to the strips and having shanks which extend through the strips and are inserted in slots 28 (one being shown in Fig. 1) formed in the running board, and, in this instance, in the adjoining portion of the front fender 21, the shanks being adapted to be turned or twisted to securely fasten the cover in place. This cover and the reenforcing and fastening means are substantially the same as those illustrated in application Serial No. 725,537 referred to above. So far as the present invention is concerned, it is immaterial how the strips are arranged in the cover and how many strips are utilized. To an extent also it is immaterial whether the strips are continuous, as illustrated in Fig. 1, or are broken up into isolated anchorage plates for the clips. In Fig. 1 the reenforcing and anchorage means for the clips are in the form of two longitudinally extending embedded strips of the type referred to, the same being illustrated in cross-section in Fig. 3. In the construction illustrated in Fig. 4, the binding strip is omitted and the cover is held in place entirely by the clips associated with reenforcements in the form of strips or isolated plates. The construction illustrated in Fig. 4 will be referred to presently.

As stated above, it is the principal aim of the invention to more thoroughly interlock the reenforcing and clip anchorage means with the rubber. In Figs. 6 and 7 the embedded metal strips, which may be similar to those described above and which are here designated 26$^a$, are molded flush with the lower surface of the rubber but at its end which is adjacent the end of the cover 23 a tongue 26$^b$ is struck up and is buried in the body of the rubber.

In Figs. 8 and 9, the reenforcing strip 26$^c$ has its entire end, designated 26$^d$, struck up from the body of the strip and buried in the rubber. It will be understood that the means utilized in either Figs. 6 and 7 of Figs. 8 and 9 will be employed at both ends of the strip.

In Figs. 10 and 11 the reenforcing strip, here designated 26$^e$, is interlocked with the rubber by having loops or straps 26$^f$ struck up from the strip and embedded in the rubber so that the rubber may be underneath them, these loops or straps being preferably arranged lengthwise of the strip wherever desired.

In Fig. 12, the strip is shown at 26$^g$ and the bond between the strip and the rubber is increased by roughing or knurling the top surface of the strip.

In Fig. 13, the bond between the strip and the rubber is increased by corrugating the strip which is here designated 26$^h$.

In Fig. 14, the strip, designated 26$^j$, is somewhat channel-shaped, the edge of the strip being turned up into the rubber.

In Fig. 15, the strip 26$^k$ is quite similar to the strip 26$^j$ of Fig. 14 but is less distinctly channel-shaped and is somewhat dished by having its edges slightly curved upwardly so as to be embedded in the rubber.

In Figs. 16 and 17, the strip 26$^m$ is deformed by having elongated protuberances 26$^n$ struck up so as to extend into the rubber beyond the body of the strip which, as in all the preceding instances, is flush with the lower surface of the rubber.

All these deformations accomplish the object of this invention by increasing the bond between the rubber and the metal without causing the location of the strips to be observable from the top of the cover and without interfering with the function of the strips as anchorage means for the clips. As previously stated, these same expedients may be used for short anchorage plates of the isolated type.

In all instances the ends of the strips or of the short anchorage plates (if they are employed) are preferably rounded to a more or less degree, as illustrated in the figures, instead of being cut sharp or square at their ends, as it has been found that the rounded ends are more suitable for retention in the rubber.

In the cover illustrated in Fig. 4 and briefly referred to heretofore, the reenforcing strips and anchorage means extend along the longitudinal margins of the cover as well as lengthwise of the cover inwardly of the margins. It will be noted that, along the front margin of the cover where it conforms to the curved front flange, the strip, here designated 26$^p$, is convexly curved to conform to the convex curvature of the board, whereas the strips which extend through the relatively flat part of the cover, and here designated 26$^q$, are dished or concaved upwardly substantially as illustrated in Fig. 15. This is a novel combination of curvatures which is effective for the purposes intended.

Thus it will be seen that there are numerous ways in which the strips of the applications previously referred to may be distorted or shaped to form more effective adhesion or interlocks between the metal and the rubber. Other ways of carrying out the invention may be employed, as, for example, by utilizing independently of or in combination with the arrangements illustrated in Figs. 6 to 15 holes in which the rubber flows in the molding and vulcanizing operation. I therefore aim in my claims to cover all modifications which do not involve a departure from the spirit and scope of the invention.

Having thus described my invention, I claim:

1. A flexible cover for a running board comprising rubber having a plurality of spaced metal reenforcements embedded flush with the lower surface of the rubber and distorted to form interlocking means between the rubber and the metal.

2. A flexible cover for running boards formed from rubber or equivalent material having fastening clips and anchorage means therefor embedded at spaced points in the rubber substantially flush with the lower surface thereof and having portions bent to extend up into the rubber to increase the bond between the metal and the rubber.

3. A flexible cover for running boards formed from rubber or equivalent material having a plurality of spaced metal reenforcing strips embedded in the rubber flush with the lower surface thereof and having part or all of one or both ends of the strips bent up into and embedded in the rubber.

4. A flexible cover for running boards formed from rubber or equivalent material having fastening clips extending through the lower surface thereof and having a plurality of spaced metal reenforcing and anchorage means for the clips molded in the rubber substantially flush with the lower surface thereof, and having edge portions of the reenforcing and anchorage means bent upward into and embedded in the rubber.

5. A flexible cover for running boards formed from rubber or equivalent material having fastening clips extending through the lower surface thereof and having a plurality of spaced metal reenforcing and anchorage means for the clips molded in the rubber substantially flush with the lower surface thereof, and having portions struck up from the body of the reenforcing and anchorage means and embedded in the rubber.

6. A flexible cover for running boards formed from rubber or equivalent material having fastening clips extending through the lower surface thereof and having a plurality of spaced reenforcing and anchorage means for the clips embedded substantially flush with the lower surface of the rubber, and having the surface of the metal which is vulcanized to the rubber roughened or corrugated.

7. A cover for a vehicle running board comprising a rubber tread having spaced metal reenforcements embedded therein with portions of the reenforcements struck up and disposed in the rubber tread above the lower surface thereof and other portions of the reenforcements substantially flush with the lower surface of the tread, and fastening clips having heads embedded in the rubber and shanks projecting from the lower surface of the tread and extending through said substantially flush portions of the reenforcements.

WILLIAM E. ENGLAND.